United States Patent
Soltis, Jr. et al.

(10) Patent No.: US 6,711,670 B1
(45) Date of Patent: *Mar. 23, 2004

(54) SYSTEM AND METHOD FOR DETECTING DATA HAZARDS WITHIN AN INSTRUCTION GROUP OF A COMPILED COMPUTER PROGRAM

(75) Inventors: Donald Charles Soltis, Jr., Fort Collins, CO (US); Ronny Lee Arnold, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/417,582

(22) Filed: Oct. 14, 1999

(51) Int. Cl.[7] ................................. G06F 9/38
(52) U.S. Cl. .................. 712/216; 712/215; 712/23; 712/24; 717/149
(58) Field of Search ................... 712/215, 216, 712/214, 217, 218, 219, 23, 24; 717/149

(56) References Cited

U.S. PATENT DOCUMENTS

| | | | |
|---|---|---|---|
| 5,355,460 A | * 10/1994 | Eickemeyer et al. | 712/215 |
| 5,471,591 A | * 11/1995 | Edmondson et al. | 712/217 |
| 5,509,130 A | * 4/1996 | Trauben et al. | 712/206 |
| 5,826,096 A | * 10/1998 | Baxter | 712/215 |
| 5,848,288 A | * 12/1998 | O'Connor | 712/24 |

OTHER PUBLICATIONS

Hennessy and Patterson, Computer Architecture A Quantitative Approach, 1996, Morgan Kaufmann Publishers Inc., Second Edition, pp. 242–261.*
Gary Lauterbach, "MicroProcessor Forum 97–Sun's Next Generation High End Sparch Microprocessor", Oct. 14–15, 1997, pp. 3–6.
Patterson, Hennessy, and Golberg, "Computer Architecture A Quantitative Approach", 1996, pp. 150–154, 191–193.
U.S. patent application Ser. No.: 09/418,286, "System and Method for Detecting an Erroneous Data Hazard between Instructions of an Instruction Group and Resulting from a Compiler Grouping Error", Oct. 14, 1999, Soltis, et al.

* cited by examiner

Primary Examiner—Richard L. Ellis
Assistant Examiner—Tonia L. Meonske

(57) ABSTRACT

A superscalar processing system that detects data hazards within instruction groups utilizes a memory, a plurality of pipelines, an instruction dispersal unit (IDU), and a control mechanism. The memory includes a plurality of entries that respectively correspond with a plurality of registers. The IDU receives an instruction group that includes a plurality of instructions and transmits the instructions of the instruction group to the plurality of pipelines. The control mechanism analyzes one of the instructions and identifies an entry in the memory that corresponds with a register associated with the one instruction. The control mechanism then analyzes the entry and transmits a warning signal in response to a determination that the entry indicates that another instruction within the instruction group is associated with the register.

31 Claims, 6 Drawing Sheets

SYSTEM AND METHOD FOR DETECTING DATA HAZARDS WITHIN AN INSTRUCTION GROUP OF A COMPILED COMPUTER PROGRAM

BACKGROUND OF THE INVENTION

1. Field of the Invention

The present invention generally relates to computer processing techniques and, in particular, to a superscalar processing system and method that detects data hazards within instruction groups of a computer program.

2. Related Art

Parallel processing, sometimes known as superscalar processing, has been developed to reduce the amount of time required to process instructions of a computer program. In parallel processing, at least two pipelines are defined that simultaneously execute instructions. One type of parallel processing is out-of-order processing, in which each pipeline of a processor simultaneously executes different instructions independently of the other pipeline(s).

In out-of-order processing, the instructions are not necessarily input into the pipelines in the same order that they were received by the processor. In addition, it typically takes different amounts of time for different instructions to execute, and it is, therefore, possible for an instruction to be fully executed before another instruction, even though the other instruction was input into its respective pipeline first. Accordingly, instructions are not necessarily executed in the same order that they are received by the pipelines within the processor, and as a result, the complexity of preventing errors from read-after-write data hazards and write-after-write data hazards, which will be described in more detail below, is relatively large for out-of-order processing.

A "read-after-write data dependency" exists when one instruction to be executed by a processor utilizes, during execution, data retrieved or produced from the execution of another instruction. If the one instruction executes before the other instruction executes, then an error may occur, since the one instruction may utilize incorrect data during execution. As a result, to prevent errors, steps should be taken to ensure that the instruction utilizing data retrieved or produced from the execution of another instruction does not execute until the necessary data from execution of the other instruction is available. If a read-after-write data dependency exists and if such steps are not taken, then a "read-after-write data hazard" exists, since the read-after-write data dependency may result in the utilization of incorrect data.

A "write-after-write data hazard" exists when an older instruction, during execution, may write data to the same register or other memory location written to by a younger instruction and incorrectly overwrite valid data written by the younger instruction. An instruction is "younger" than another instruction when it is received by a processor after the other instruction. Conversely, an instruction is "older" than another instruction when it is received by a processor before the other instruction.

As an example of a write-after-write data hazard, assume that a first instruction is a load instruction that retrieves data and writes the retrieved data to a particular register. It may take a relatively long time for the data to be retrieved, particularly if the data to be retrieved is not locally available. Therefore, it is possible for a second instruction (i.e., an instruction younger than the first instruction) to write data to the same register after the first instruction has executed but before the data retrieved by the first instruction is written to the register. In such a case, the data written to the register by the second instruction may be overwritten by the data retrieved by the first instruction. As a result, the register may contain incorrect data, and an error may result when a later instruction uses the data in the register.

To prevent errors from read-after-write data hazards and from write-after-write data hazards, most out-of-order parallel processors employ a control mechanism. In this regard, during the execution of each instruction, the control mechanism determines whether an instruction being processed (referred to hereafter as the "pending instruction") requires data produced by the execution of an older instruction. If so, the control mechanism then determines whether the older instruction has been processed, at least to the point where the needed data is available. If this data is not yet available, the control mechanism stalls (i.e., temporarily stops) processing of the pending instruction until the necessary data becomes available, thereby preventing errors from read-after-write data hazards.

In addition, the control mechanism also determines whether data from (i.e., generated or retrieved by) an older instruction is to be written to the same register or memory location as the data from a pending instruction. If so, the control mechanism stalls the pending instruction until the data from the older instruction has been written to the register or memory address, thereby preventing errors from write-after-write data hazards. Consequently, the control mechanism may stall the pending instruction in order to prevent errors from either read-after-write data hazards or from write-after-write data hazards.

Stalling of the pending instruction is usually accomplished by asserting a stall signal transmitted to the pipeline executing the pending instruction. In response to the asserted stall signal, the pipeline is designed to stop execution of the pending instruction until the stall signal is deasserted by the control mechanism. Once the read-after-write data hazard or the write-after-write data hazard no longer exists, the control mechanism deasserts the stall signal, and in response, the pipeline resumes processing of the pending instruction. The control mechanism required to detect and prevent potential errors from read-after-write data hazards and from write-after-write data hazards is relatively complex in out-of-order processors, and as the number of pipelines is increased, the complexity of the control mechanism increases dramatically.

As a result, many conventional parallel processors, particularly processors having a large number of pipelines, employ an in-order type of processing in lieu of the out-of-order type of processing described above. In in-order processing, the instructions being processed by the different pipelines are stepped through the stages of the pipelines on certain edges of a system clock signal. In this regard, the processing of instructions in a pipeline is usually divided into stages, and each stage of the pipeline simultaneously processes a different instruction.

As an example, the processing performed by each pipeline may be divided into a register stage, an execution stage, a detect exceptions stage, and a write stage. During the register stage, any operands necessary for the execution of an instruction are obtained. Once the operands have been obtained, the processing of the instruction enters into the execution stage in which the instruction is executed. After the instruction has been executed, the processing of the instruction enters into a detect exceptions stage in which conditions, such as overruns during execution, for example, that may indicate data unreliability are checked. After the detect exceptions stage is completed, a write stage is entered in which the results of the execution stage are written to a register.

A key feature of in-order processing is that each instruction of an issue group steps through each stage at the same time. An "issue group," as defined herein, is a set of instructions simultaneously (i.e., during the same clock cycle) processed by the same stage of different pipelines within a single processor. As an example, assume that each stage of each pipeline processes one instruction at a time, as is typically done in the art. The instructions in the detect exceptions stage of the pipelines form a first issue group, and the instructions in the execution stage of the pipelines form a second issue group. Furthermore, the instructions in the register stage of the pipelines form a third issue group. In the absence of a stall, each of the issue groups advances into the next respective stage in response to an active edge of the system clock signal. In other words, the first issue group steps into the write stage, the second issue group steps into the detect exceptions stage, and the third issue group steps into the execution stage in response to an active edge of the system clock signal.

As used herein, an "active edge" is any edge of the system clock signal, the occurrence of which induces each unstalled instruction in a pipeline to advance to the next stage of processing in the pipeline. For example, assume that a processor is designed to step each unstalled instruction into the next stage of processing every three clock cycles. In this example, the active edges could be defined as every third rising edge of the clock signal. It should be noted that which edges of the clock signal are designated as "active edges" is based on design parameters and may vary from processor to processor.

During in-order processing, any instruction in one issue group preferably does not pass another instruction in another issue group. In other words, instructions of one issue group input into the pipelines after the instructions of another issue group are prevented from entering into the same stage processing any of the instructions of the other issue group. Therefore, at any point in time, each stage of the pipelines is respectively processing instructions from only one issue group. Since instructions from different issue groups are prevented from passing each other, the control mechanism for controlling the pipelines and for stalling instructions to prevent errors from read-after-write data hazards and from write-after-write data hazards is greatly simplified and is, therefore, often preferable over out-of-order processing.

However, errors from read-after-write data hazards and write-after-write data hazards are not adequately prevented in some in-order processors. In this regard, an instruction dispersal unit (IDU) is often utilized to define the issue groups that are processed by the processor pipelines. Furthermore, in some in-order processors, such as processors that utilize explicitly parallel instruction computing (EPIC), for example, the instructions are transmitted to the IDU in instruction groups. An instruction group is a set of instructions guaranteed by a compiler or some other device external to the processor not to have read-after-write data hazards or write-after-write data hazards between the instructions of the set.

For example, many compilers sequentially transmit instructions to the IDU. In compiling the instructions, the compiler may determine whether read-after-write data hazards or write-after-write data hazards exist. To optimize performance, the compiler may define an instruction group by inserting stop bits so that the IDU can more efficiently process the instructions. As used herein, a "stop bit" is a bit inserted between instructions being transmitted to a processing system, wherein the bit can be appropriately asserted or deasserted to indicate the start or end of an instruction group.

In this regard, the compiler determines when consecutively transmitted instructions define an instruction group and asserts a stop bit before the first instruction in the group and after the last instruction in the group. As a result, the instructions between asserted stop bits define an instruction group, and the IDU, therefore, should be aware that no instruction between asserted stop bits should have a read-after-write data hazard or a write-after-write data hazard with another instruction between the asserted stop bits. Therefore, in defining the issue groups, the IDU does not have to check for read-after-write data hazards and write-after-write hazards between the instructions in the instruction group.

However, a problem arises when the compiler incorrectly includes two instructions having a read-after-write data hazard or a write-after-write data hazard therebetween in the instruction group. Since the IDU may not be designed to check for read-after-write data hazards and write-after-write data hazards between instructions in the same instruction group (relying instead on the assertion/deassertion of stop bits to indicate read-after-write and write-after-write data hazards), the IDU may improperly define the issue groups such that two instructions in the same issue group have a read-after-write data hazard or a write-after-write data hazard therebetween. Having a read-after-write or write-after-write data hazard between two instructions of the same issue group violates the architecture of the in-order processor and may result in errors during processing of the two instructions by the processor pipelines.

Thus, a heretofore unaddressed need exists in the industry for providing a system and method of determining when an instruction group includes two instructions that have a read-after-write data hazard or a write-after-write data hazard therebetween.

SUMMARY OF THE INVENTION

The present invention overcomes the inadequacies and deficiencies of the prior art as discussed hereinbefore. Generally, the present invention provides a system and method for determining whether an instruction group includes an instruction defining a data hazard with another instruction of the same instruction group.

In architecture, the system of the present invention utilizes a memory, a plurality of pipelines, an instruction dispersal unit (IDU), and a control mechanism. The memory includes a plurality of entries that respectively correspond with a plurality of registers. The IDU receives an instruction group that includes a plurality of instructions and transmits the instructions of the instruction group to the plurality of pipelines. The control mechanism analyzes one of the instructions and identifies an entry in the memory that corresponds with a register associated with the one instruction. The control mechanism then analyzes the entry and transmits a warning signal in response to a determination by the control mechanism that the entry indicates that another instruction within the instruction group is associated with the register. In response to the warning signal, a warning message may be produced to notify a user that two instructions of an instruction group define a read-after-write or a write-after-write data hazard, and/or further processing of the instructions may be terminated.

In accordance with another feature of the present invention, the control mechanism resets the entries in the memory when the control mechanism determines that each instruction of the instruction group has been analyzed by the control mechanism.

The present invention can also be viewed as providing a superscalar processing method for processing instructions of computer programs and for detecting hazards within the computer programs. The method can be broadly conceptualized by the following steps: defining an instruction group, the instruction group including a plurality of instructions; analyzing one of the instructions; identifying a memory entry that corresponds with the one instruction; analyzing the entry in response to the identifying step; determining, via the analyzing step, whether the entry indicates that another instruction within the instruction group is associated with the register; and transmitting a warning signal in response to a determination in the determining step that another instruction within the instruction group is associated with the register.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE PREFERRED EMBODIMENT

Figure 1:
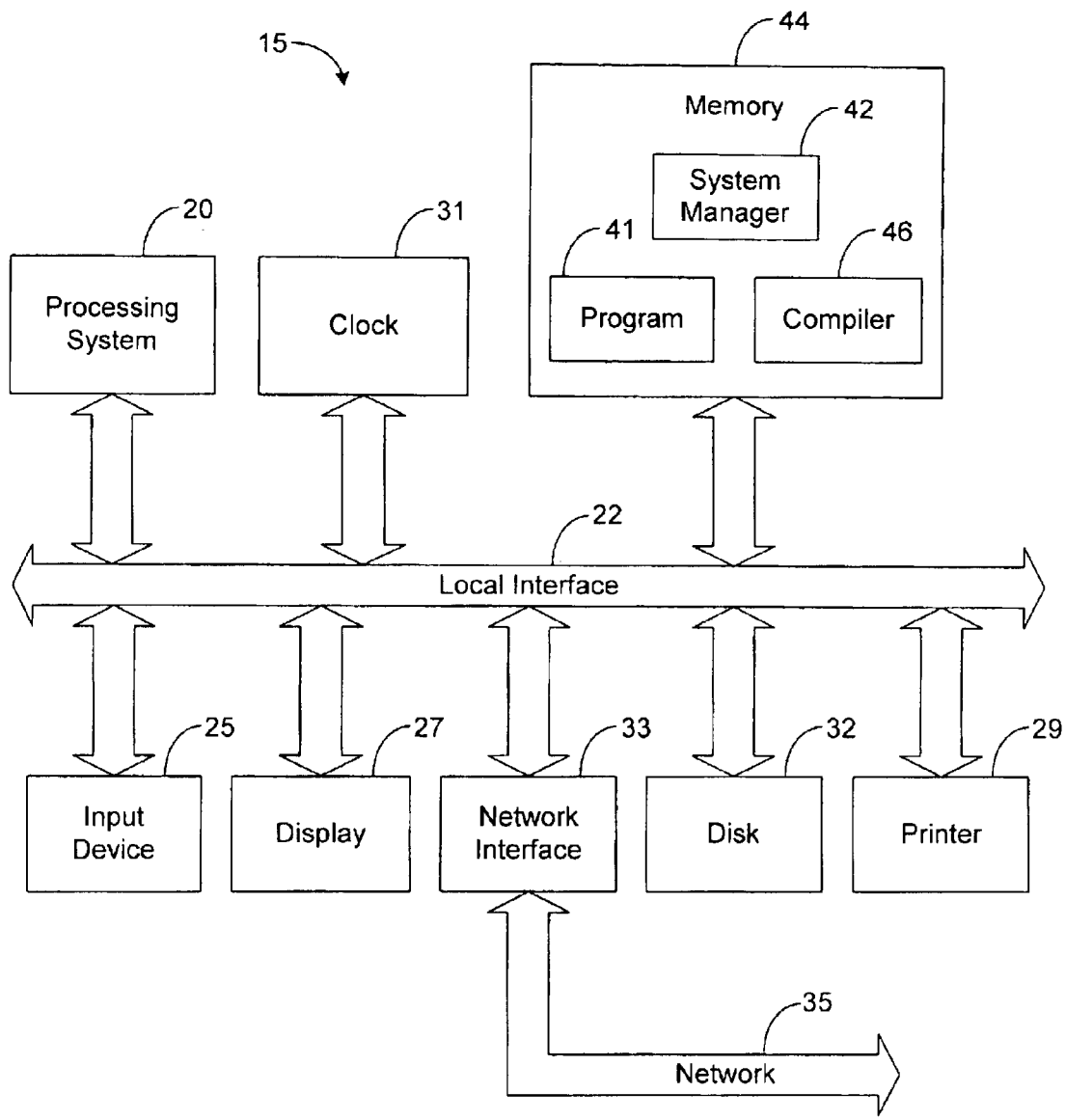
FIG. 1 is a block diagram illustrating a computer system that employs a processing system in accordance with the present invention.

The present invention relates to a superscalar processing system and method for determining whether an instruction group includes instructions having data hazards with other instructions in the instruction group. FIG. 1 depicts the preferred embodiment of a computer system 15 employing the processing system 20 of the present invention. The processing system 20 of the preferred embodiment is preferably implemented in hardware, although it is possible to implement portions of the processing system 20 in software, if desired.

As shown by FIG. 1, the computer system 15 includes a local interface 22, which can include one or more buses, that allows the processing system 20 to communicate with the other elements of the computer system 15. Furthermore, an input device 25, for example, a keyboard and/or a mouse, can be used to input data from a user of the system 15, and a screen display 27 and/or a printer 29, can be used to output data to the user. A system clock 31 produces a clock signal, which is used through techniques known in the art to control the timing of data communicated by the system 15. A disk storage mechanism 32 can be connected to the local interface 22 to transfer data to and from a nonvolatile disk (e.g., magnetic, optical, etc.). If desired, the system 15 can be connected to a network interface 33 that allows the system 15 to exchange data with a network 35.

The system 15 additionally includes a program 41, a system manager 42, and a compiler 46 stored in memory 44. The program 41 includes instructions that are to be processed and executed by the processing system 20. The system manager 42 is designed to receive inputs from input device 25 and/or network interface 33 and to transmit the instructions of the program 41 to the processing system 20, when desired. Before transmitting the instructions of the program 41 to the processing system 20, the instructions are preferably first translated by the compiler 46 into a form compatible with the processing system 20. For example, if the instructions of the program 41 are written in a high level computer language, for example, C or Fortran, then the compiler 46 is designed to translate the instructions into a machine language that is compatible with the processing system 20.

Figure 2:
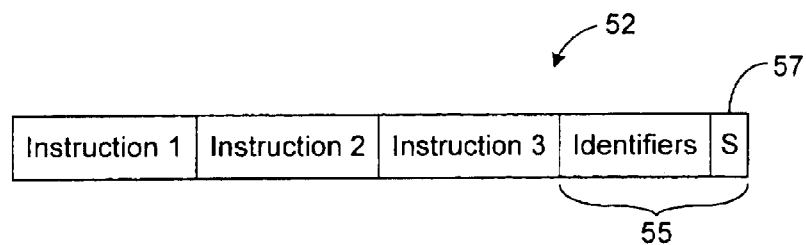
FIG. 2 is a block diagram illustrating a exemplary bundle of instructions transmitted to the processing system depicted in FIG. 1.

In the preferred embodiment, the compiler 46 defines instruction bundles that include the translated instructions and that can be transmitted directly to the processing system 20. FIG. 2 depicts an instruction bundle 52 in accordance with the principles of the present invention. As shown by FIG. 2, each bundle 52 includes data defining one or more instructions, and each bundle 52 also includes a header 55. The header 55 includes identifier information that identifies the type of instructions that are included in the bundle 52. For example, the header 55 may include information indicating that the first instruction in the bundle 52 is a memory operation instruction, that the second instruction in the bundle 52 is an integer operation instruction, that the third instruction in the bundle 52 is a floating point operation. The header 55 also includes a stop bit 57, which will be described in more detail hereinbelow. Although instruction bundle 52 is shown in FIG. 2 as including three instructions, any number of instructions may be included in bundle 52.

In defining the instruction bundles 52, the compiler 46 is preferably designed to check for read-after-write data hazards and write-after-write data hazards and to ensure that no two instructions defining a read-after-write data hazard or a write-after-write data hazard are placed in the same bundle 52. In addition, the compiler 46 is designed to consecutively transmit the bundles 52 to processing system 20 in program order (i.e., the order in which the instructions should be executed), and the compiler 46 is preferably designed to ensure that no read-after-write data hazards or write-after-write data hazards exist between instructions in bundles 52 that are bound by asserted stop bits 57. Therefore, if the processing system 20 receives a string of instruction bundles 52 having deasserted stop bits 57, then the processing system 20 is aware that none of the instructions in the string is dependent on any of the other instructions in the string or that none of the instructions in the string writes data to the same register as any of the other instructions in the string.

Figure 3:
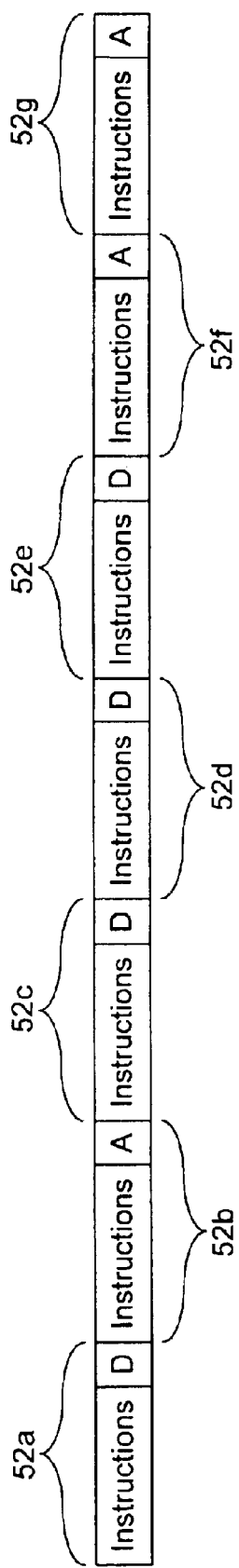
FIG. 3 is a block diagram illustrating an exemplary set of instruction bundles that defines at least one instruction group.

For example, refer to FIG. 3, which shows a string of bundles 52a–52g that are consecutively transmitted to processing system 20 in the order shown by FIG. 3. In FIG. 3, each bundle 52a, 52c, 52d, and 52e including a "D" has a deasserted stop bit 57, and each bundle 52b, 52f, and 52g including an "A" has an asserted stop bit 57. By analyzing the stop bits 57, it can be determined that, according to the compiler 46, there may be a read-after-write data hazard or a write-after-write data hazard between an instruction within bundle 52f and an instruction within bundle 52g. However, since bundles 52c, 52d, and 52e have deasserted stop bits 57, it can be determined that, according to the compiler 46, no read-after-write data hazards or write-after-write data hazards exist between any of the instructions in bundles 52c, 52d, 52e, and 52f. In other words, bundles 52c, 52d, 52e, and 52f define an instruction group. Furthermore, since bundle 52b has an asserted stop bit 57, bundle 52a and/or 52b may include an instruction having a read-after-write data hazard or a write-after-write data hazard with one of the instructions in the instruction group defined by bundles 52c, 52d, 52e, and 52f.

It should be noted that there may be other ways to transmit instruction bundles 52 to processing system 20 without departing from the principles of the present invention. Any method of transmitting bundles 52 to processing system 20 while indicating the existence of instruction groups is suitable for implementing the present invention.

Figure 4:
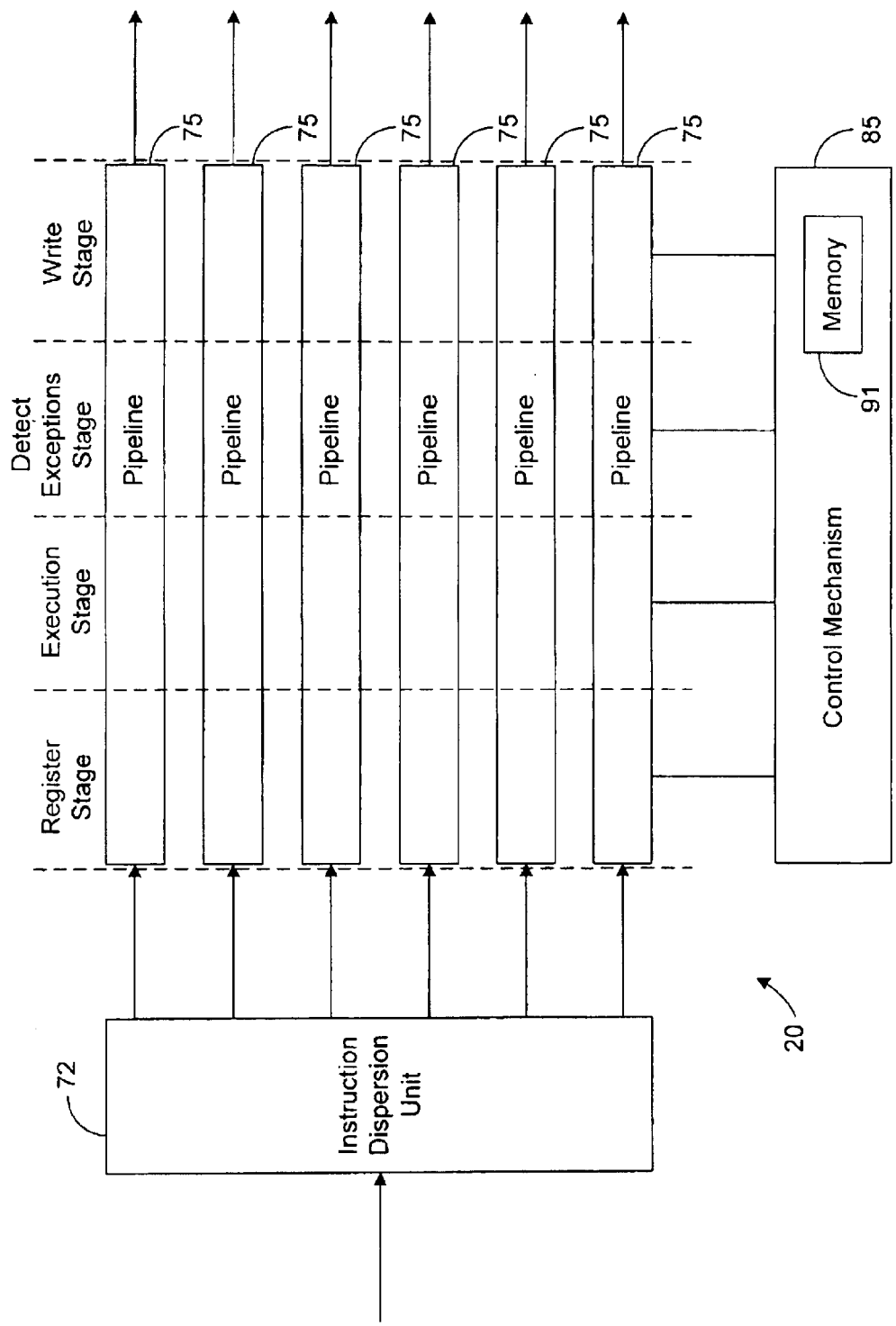
FIG. 4 is a block diagram illustrating a more detailed view of the processing system depicted in FIG. 1.

As shown by FIG. 4, the processing system 20 includes an instruction dispersal unit (IDU) 72 that is designed to receive the instruction bundles 52 transmitted to the processing system 20. The IDU 72 is configured to define issue groups with the instructions of the instruction bundles 52 received by the IDU 72 and to transmit the instructions of a single issue group to pipelines 75 such that each instruction of the issue group is received by only one of the pipelines 75. The pipelines 75 are designed to further process and execute the received instructions. Similar to conventional pipelines in parallel in-order processors, the pipelines 75 preferably process the received instructions in stages.

Figure 5:
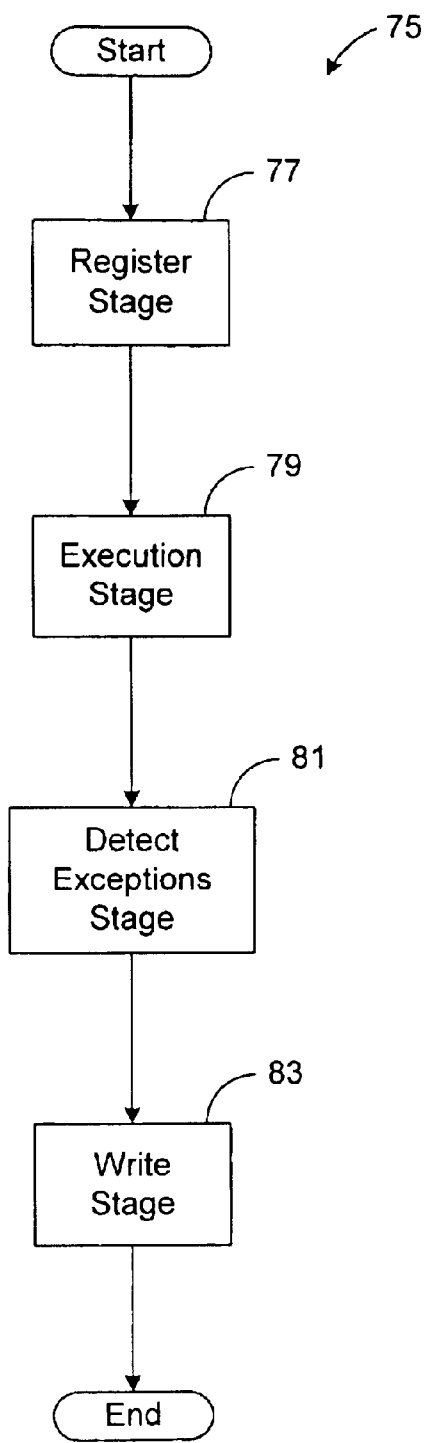
FIG. 5 is a flow chart illustrating the processing stages of the processing system depicted in FIG. 1.

FIG. 5 depicts an exemplary set of stages for the pipelines 75. In this regard, each of the pipelines 75 receives an instruction and sequentially processes the instruction in a register stage 77, in an execution stage 79, in a detect exceptions stage 81, and finally in a write stage 83. These stages are described in more detail in the Background section, and it should be noted that other stages and/or other combinations of stages may be utilized to process and execute the instructions.

In defining the issue groups, the IDU 72 is preferably designed to ensure that each instruction is only transmitted to a pipeline 75 compatible with the instruction. In this regard, some of the pipelines 75 may only be designed to handle certain types of instructions. For example, one or more of the pipelines 75 may be configured to only handle memory operation instructions, integer operation instructions, floating point instructions, or other known types of instructions. Accordingly, the IDU 72 is designed to analyze the received instructions and to define the issue groups such that appropriate types of instructions are transmitted to each pipeline 75. In the preferred embodiment, the IDU 72 may analyze the header 55 of each instruction bundle 52 to determine which instructions are compatible with which pipelines 75.

The IDU 72 is also designed to ensure that two instructions defining a read-after-write data hazard or a write-after-write data hazard are not placed in the same issue group. Therefore, each instruction that enters into the first stage of processing (i.e., the register stage 77 in the preferred embodiment) on an active edge of the clock signal produced by clock 31 should have no data dependencies with any of the other instructions entering into the first stage on the same clock edge. Further, each instruction that enters into the first stage of processing on the edge of the clock signal also should not write data to the same register as any of the other instructions entering into the first stage on the same clock edge.

Since the stop bits 57 of the instruction bundles 52 indicate whether read-after-write data dependency or write-after-write data hazards exist between the instructions of consecutive instruction bundles 52, as described hereinabove, the IDU 72 preferably utilizes the stop bits 57 to simplify the process of defining issue groups. In this regard, the IDU 72 may place any of the instructions of a string of bundles 52 defining an instruction group into the same issue group without checking for read-after-write data hazards or write-after-write data hazards between the instructions of the instruction group.

The IDU 72 is further designed to ensure that younger instructions do not complete the processing of pipelines 75 before older instructions. In this regard, it is well known that the processing of instructions should be completed in the same order (referred to as "program order") defined by the original program 41. The program order is the order that the instructions are transmitted to the processing system 20.

Each instruction's age is based on its location within the "program order." For example, the first instruction to be executed in a program 41 (i.e., the first instruction of a program received by the processing system 20) is the oldest instruction, and all other instructions of the program are younger than this instruction. The next instruction to be executed after the first instruction (i.e., the next instruction of a program received by the processing system 20 after the first instruction) is younger than the first instruction but older than the rest of the instructions of the program 41. Moreover, the last instruction that should be executed is the youngest instruction. Even though superscalar processors process multiple instructions at once, the instructions should complete processing (i.e., complete the write stage 83 in the example described hereinbefore) in the same order as if a non-superscalar processor were stepping through the program 41 and processing the instructions one at a time. To ensure that younger instructions do not complete processing prior to older instructions, the IDU 72 preferably does not assign an older instruction to an issue group that will be transmitted to pipelines 75 after an issue group containing a younger instruction.

Once the issue groups have been defined, the IDU 72 is designed to sequentially transmit each issue group in an in-order fashion to the pipelines 75. Therefore, each instruction within an issue group is transmitted to its respective pipeline 75 on the same active edge of the clock signal. Ideally, each instruction within each issue group is completely processed in its respective stage between active edges of the clock signal such that each instruction in the issue group steps into the next stage on the same clock edge. Therefore, in the absence of stalls, the instructions of the issue group in the register stage 77 enter into the execution stage 79 on the same clock edge that the instructions of the issue groups in execution stage 79 and detect exceptions stage 81 respectively step into the detect exceptions stage 81 and the write stage 83. Furthermore, as the instructions of the issue groups in the register stage 77, execution stage 79, and detect exceptions stage 81 step into the next respective stage, instructions of a new issue group step into the register stage 77. As a result, the processing of the issue groups is in-order in that no instruction from one issue group enters into the same stage as an instruction in another issue group.

As shown by FIG. 4, the processing system 20 preferably includes a control mechanism 85 coupled to pipelines 75. For simplicity, the control mechanism 85 of FIG. 4 is shown as being coupled to only one of the pipelines 75. However, in the preferred embodiment, the control mechanism 85 is similarly coupled to each of the pipelines 75.

The control mechanism 85 is designed to analyze the data processed by pipelines 75 and to stall instructions, if appropriate, to prevent errors from read-after-write data hazards or write-after-write data hazards. In this regard, the control mechanism 85 is configured to determine whether read-after-write data hazards or write-after-write data hazards exist between instructions of different issue groups. The control mechanism 85 is then configured to stall an instruction or the issue group including an instruction that has the potential of causing an error due to one of the aforementioned hazards until at least the potential for error passes. Copending U.S. patent application Ser. No. 09/391,023 entitled "Superscalar Processing System and Method for Efficiently Preventing Errors Caused by Write-After-Write Data Hazards,", and copending U.S. patent application Ser. No. 09/390,199 entitled "Superscalar Processing System and Method for Efficiently Performing In-Order Processing of Instructions,", which are both filed by the present inventors and incorporated herein by reference, describe a system and method of stalling instructions being processed by pipelines 75.

However, conventional control mechanisms are generally not designed to prevent errors from read-after-write data hazards or write-after-write data hazards, when the instructions creating the hazards are located in the same issue group. Furthermore, as stated hereinbefore in the Background section, the IDU 72 may incorrectly assign two instructions defining a read-after-write data hazard or a write-after-write data hazard into the same issue group when the compiler 46 incorrectly indicates that these two instructions are in the same instruction group. Therefore, it is desirable to know when the compiler 46 has incorrectly included two instructions that define a read-after-write data hazard or write-after-write data hazard within the same instruction group. This information is useful to detect errors, when the two instructions are assigned to the same issue group, and it is also useful to detect potential errors that may occur in the future, even though the two instructions presently have not been included in the same issue group.

In this regard, IDU 72 may assign the two instructions to different issue groups, and the control mechanism 85 may prevent any errors by stalling one of the two instructions. However, there is no guarantee that the two instructions will be assigned to different issue groups in future executions of the program 41, and it, therefore, would be desirable to know when the two instructions are included in the same instruction group, even though the two instructions have not presently been assigned to the same issue group by IDU 72. Therefore, in analyzing the data being processed by pipelines 75, the control mechanism 85 preferably determines whether a read-after-write data dependency or a write-after-write data hazard exists between any of the instructions of an instruction group with any other of the instructions of the same instruction group.

In the preferred embodiment, the IDU 72 inserts data in at least one of the instructions (i. e., tags at least one of the instructions) of an instruction group so that the control mechanism 85 can determine which instructions are associated with the same instruction group when analyzing the instructions in program order. For example, the first or last instruction of an instruction group can be tagged to respectively indicate the start or end of the instruction group as the instructions are being analyzed in program order. However, there may be other methodologies of indicating to control mechanism 85 which instructions are associated with which instruction groups without departing from the principles of the present invention.

Furthermore, as shown by FIG. 4, the control mechanism 85 includes memory 91. The memory 91 preferably includes one entry per register of the processing system 20. In this regard, the processing system 20, similar to processing systems of the prior art, includes a certain number of registers where data can be read from or written to during the processing of instructions by the pipelines 75. Therefore, memory 91 could include a string of data bits, where each bit represents one of the registers of the processing system 20. In other words, each bit is an entry of memory 91 that corresponds to a particular register of the processing system 20. It is possible for the string to be stored at a single address in memory 91 or to be stored at multiple addresses in memory 91. In another example, each entry is located at a different address in memory 91. In other words, the data stored at a particular address in memory 91 represents a particular register of the processing system 20. As a result, the data corresponding to a particular register can be identified based on the data's address.

For illustrative purposes, it will be assumed hereafter that the entries of memory 91 correspond to the bits within a string of bits located at a particular address in memory such that each bit of the string corresponds to an entry and, therefore, to a particular register of the system 20. However, there are various other methodologies that may be employed in other embodiments to represent each register of processing system 20 with an entry in memory 91 without departing from the principles of the present invention. Furthermore, although the memory 91 is located in the control mechanism 85 of the preferred embodiment, as shown by FIG. 4, the memory 91 may be located at other locations within or outside computer system 15, if desired.

Similar to conventional in-order processing systems, the control mechanism 85 is designed to analyze each instruction of an issue group while the issue group is being processed by one of the stages 77, 79, 81, or 83 to determine whether any of these instructions should be stalled. When the control mechanism 85 analyzes a write instruction, the control mechanism 85 is designed to analyze the entry in memory 91 corresponding to the register that is to be written to by the write instruction. A write instruction is any instruction that stores data to a register associated with processing system 20.

The foregoing entry preferably indicates whether the control mechanism 85 has previously detected another write instruction within the same instruction group that writes data to the register associated with the entry. In the preferred embodiment, the bit defining the entry is asserted if another such instruction has been detected and is deasserted if another such instruction has not been detected. Therefore, if the bit is asserted, then the control mechanism 85 is aware that another write instruction in the same instruction group utilizes the same register used by the instruction currently being analyzed. In other words, the control mechanism 85 is aware that a write-after-write data hazard exists.

In response to such a determination, the control mechanism 85 is designed to transmit a warning signal indicating that the instruction currently being analyzed utilizes the same register written to by another instruction in the same instruction group. However, if the bit is deasserted, then the control mechanism 85 asserts the bit so that the entry now indicates that a write instruction utilizes the register corresponding to the entry. It is well known that bits can be asserted or deasserted by storing either a logical high or a logical low value for the bit.

In addition, when the control mechanism 85 analyzes a read instruction, the control mechanism 85 is designed to analyze the entry in memory 91 corresponding to the register that is to be read from by the read instruction. A read instruction is any instruction that reads data from a register associated with the processing system 20. If the bit in the entry is asserted, then the control mechanism 85 is aware that the control mechanism 85 has previously analyzed a write instruction in the same instruction group that writes data to the same register used by the read instruction. In other words, the control mechanism 85 is aware that a read-after-write data hazard exists. Therefore, in response to a determination that the bit is asserted, the control mechanism 85 is configured to transmit a warning signal indicating that the instruction being analyzed by the control mechanism 85 utilizes the same register that is written to by another instruction in the same instruction group.

Furthermore, the control mechanism 85 is designed to reset the entries of memory 91 when the control mechanism 85 determines that each of the instructions of an instruction group has been analyzed. After resetting the entries, each entry indicates that a previous instruction utilizing the register corresponding to the entry has not been detected. In the preferred embodiment, the control mechanism 85 resets the entries by deasserting each bit defining an entry of memory 91.

Since the control mechanism 85 analyzes instructions in program order, the control mechanism 85 will completely analyze all the instructions of one instruction group before analyzing any of the instructions of another instruction group. Therefore, the control mechanism 85 may deassert (i.e., reset) the bits in the entries of memory 91 after the control mechanism 85 has analyzed the last instruction (and, if necessary, asserted the bit in the entry corresponding with the register utilized by the last instruction) of one instruction group and before the control mechanism 85 has analyzed the memory 91 in analyzing the first instruction of the next instruction group. Although various methodologies may be employed to achieve this functionality, the control mechanism 85 may reset the bits in memory 91 in response to a determination that the instruction being analyzed is the first or last instruction of an instruction group. The control manager 85 may make this determination by analyzing the data inserted into the first or last instruction of the instruction group by the IDU 72, as described hereinabove.

In the preferred embodiment, the warning signal transmitted by the control mechanism 85 is received by the system manager 42, which may terminate execution of the program 41 in response to the warning signal. In addition, the warning signal may be received by display 27 and/or printer 29, which produces a warning message to the user indicating that a violation has occurred. The warning signal and warning message preferably include sufficient information such that the user can determine which instruction was the one being analyzed when the control mechanism 85 discovered the violation.

It should be noted that most read instructions cause data to be read from its register relatively quickly once the read instruction is input to the pipelines 75. Most write instructions, on the other hand, cause data to be written to its register further along the processing of pipelines 75. For example, a read instruction typically causes data to be read from its associated register in the register stage 77, whereas a write instruction typically causes data to be written to its associated register in the write stage 83. Therefore, a read instruction in the same instruction group with a younger write instruction is likely to read data from a register before the write instruction writes data to it. Accordingly, when the read instruction is older than the write instruction, an error is not likely to occur, even if the read instruction and the write instruction are in the same instruction group. As a result, it is not critical for the user to be warned when an older read instruction that utilizes the same register as a younger write instruction is in the same instruction group as the younger write instruction. In other words, it is not critical for a warning signal to be produced for a write-after-read data hazard.

Therefore, in the preferred embodiment, the control mechanism 85 does not assert the bit in the entry corresponding to the register utilized by a read instruction when the read instruction is analyzed. Instead, bits in memory 91 are asserted only in response to write instructions. As a result, a warning signal is not produced, and a user is, therefore, not warned when a read instruction utilizes the same register as a younger read or write instruction in the same instruction group.

However, if desired, the user may be warned when a read instruction utilizes the same register as a younger write instruction. In other words, a warning signal may be produced whenever the control mechanism 85 detects that two instructions in the same instruction group define a write-after-read data hazard. To accomplish this functionality, the control mechanism 85 sets the data of entries within memory 91 to indicate whether the control mechanism 85 has previously detected read instructions that utilize the register associated with the entries. For example, in embodiments in which each entry is a bit of data, the control mechanism 85 may be configured to assert the bit in an entry that corresponds with a register utilized by a read instruction. Therefore, instead of indicating whether a write instruction has been previously detected by the control mechanism 85, the entry indicates whether a read instruction has been previously detected.

When the control mechanism 85 analyzes a write instruction, the control mechanism 85 checks the entry corresponding with the register utilized by the write instruction. If the entry indicates that an older read instruction has been detected (i.e., if the bit in the entry is asserted in the foregoing example), then the control mechanism 85 is aware that a write-after-read data hazard exists within the instruction group and transmits a warning signal to indicate that a write-after-read data hazard exists within the instruction group.

By having two entries correspond to each register, the control mechanism 85 can detect read-after-write and write-after-write data hazards, as well as write-after-read data hazards. In this regard, one entry may be used to indicate whether an older write instruction utilizing the corresponding register has been detected, and the other entry may be used to indicate whether an older read instruction utilizing the corresponding register has been detected. It is also possible to define a single entry that indicates not only whether a previous instruction utilizes a register but also what types (i.e., write and/or read) of instructions have previously utilized the register.

It should be further noted that the present invention has been described hereinabove in the context of in-order processing. However, the principles of the present invention may be applied to out-of-order processing. In this regard, out-of-order processors may also receive instructions to be executed via instruction groups, such as the instruction groups described hereinabove. Therefore, as long as the out-of-order processor includes a mechanism, similar to control mechanism 85, that keeps track of which registers are utilized by the instructions of each instruction group, then the principles of the present invention may be implemented for the out-of-order processor.

Operation

The preferred use and operation of the processing system 20 and associated methodology are described hereafter.

As issue groups are stepped through pipelines 75, the control mechanism 85 analyzes the instructions that pass through the stages 77, 79, 81, and 83. When analyzing instructions in one of the stages 77, 79, 81, or 83, the control mechanism 85 performs the functionality depicted in FIG. 6. In this regard, assume for illustrative purposes that the control mechanism 85 implements the functionality of FIG. 6 while analyzing the instructions in the execution stage 79, although it is possible for the control mechanism 85 to implement the functionality of FIG. 6 while analyzing the instructions of any of the other stages 77, 81, or 83.

As shown by block 108, the control mechanism 85 initially analyzes the first instruction in the stage 79, and determines whether the instruction is associated with a new instruction group, as depicted by block 112. If the instruction is associated with a new instruction group, the control mechanism 85 resets the entries in memory 91, as shown by block 114, such that each entry indicates that the register corresponding with the entry has not been utilized by an earlier instruction. To achieve this functionality in the preferred embodiment, the control mechanism 85 deasserts each bit in memory 91 that is associated with a register.

After performing block 112 and, if appropriate, block 114, the control mechanism 85 in block 115 analyzes the entry in memory 91 that corresponds with the register utilized by the instruction (referred to hereafter as the "present instruction") being analyzed by the control mechanism 85. As shown by blocks 117 and 119, if the entry indicates that a previously analyzed write instruction in the instruction group utilizes the same register as the present instruction, the control mechanism 85 transmits a warning signal.

In the preferred embodiment, the entry indicates that a previously analyzed write instruction in the instruction group utilizes the same register as the present instruction when the bit in the entry corresponding to the register is asserted. If the bit is deasserted, then the control mechanism 85 is aware that no other instruction in the same instruction group has been analyzed that writes to the same register utilized by the present instruction and, therefore, that no warning signal needs to be transmitted. As a result, the control mechanism 85 transmits the warning signal in block 119 in response to a determination that the bit corresponding with the register utilized by the present instruction is asserted.

If the entry does not indicate that a previously analyzed write instruction utilizes the same register, then the control mechanism 85 determines in block 123 whether the present instruction is a write instruction. If so, the control mechanism 85 in block 125 sets the data in the entry corresponding with the register utilized by the present instruction (i.e., the register written to by the present instruction) such that the entry indicates that an instruction of the instruction group writes data to the corresponding register. Therefore, in the preferred embodiment, the control mechanism 85 asserts the bit in the entry corresponding with the register utilized by the present instruction.

After performing block 119 or block 123 (and, if appropriate, block 125), the control mechanism 85 determines in block 128 whether there are any instructions in the stage 79 that have yet to be analyzed. If so, the control mechanism 85 analyzes the next instruction, as shown by block 131, and repeats the aforementioned process (starting with block 112) for the next instruction. As depicted by block 135, if all of the instructions in the stage 79 have been analyzed, the control mechanism 85 waits for the next issue group to step into the stage 79 before repeating the aforementioned process (starting with block 108).

Figure 6:
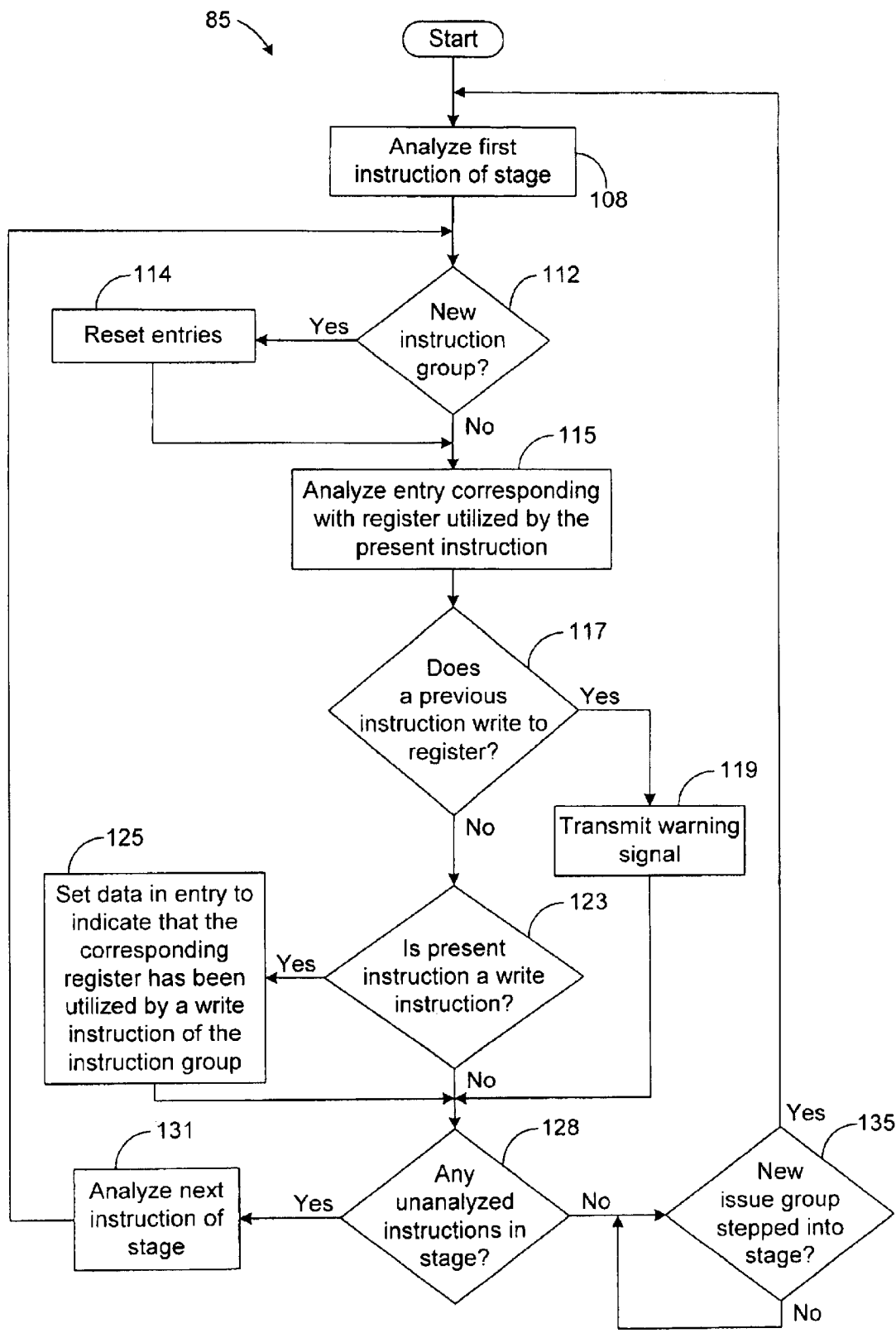
FIG. 6 is a flow chart illustrating the architecture and functionality of the preferred embodiment of the control mechanism depicted in FIG. 4.
Figure 7:
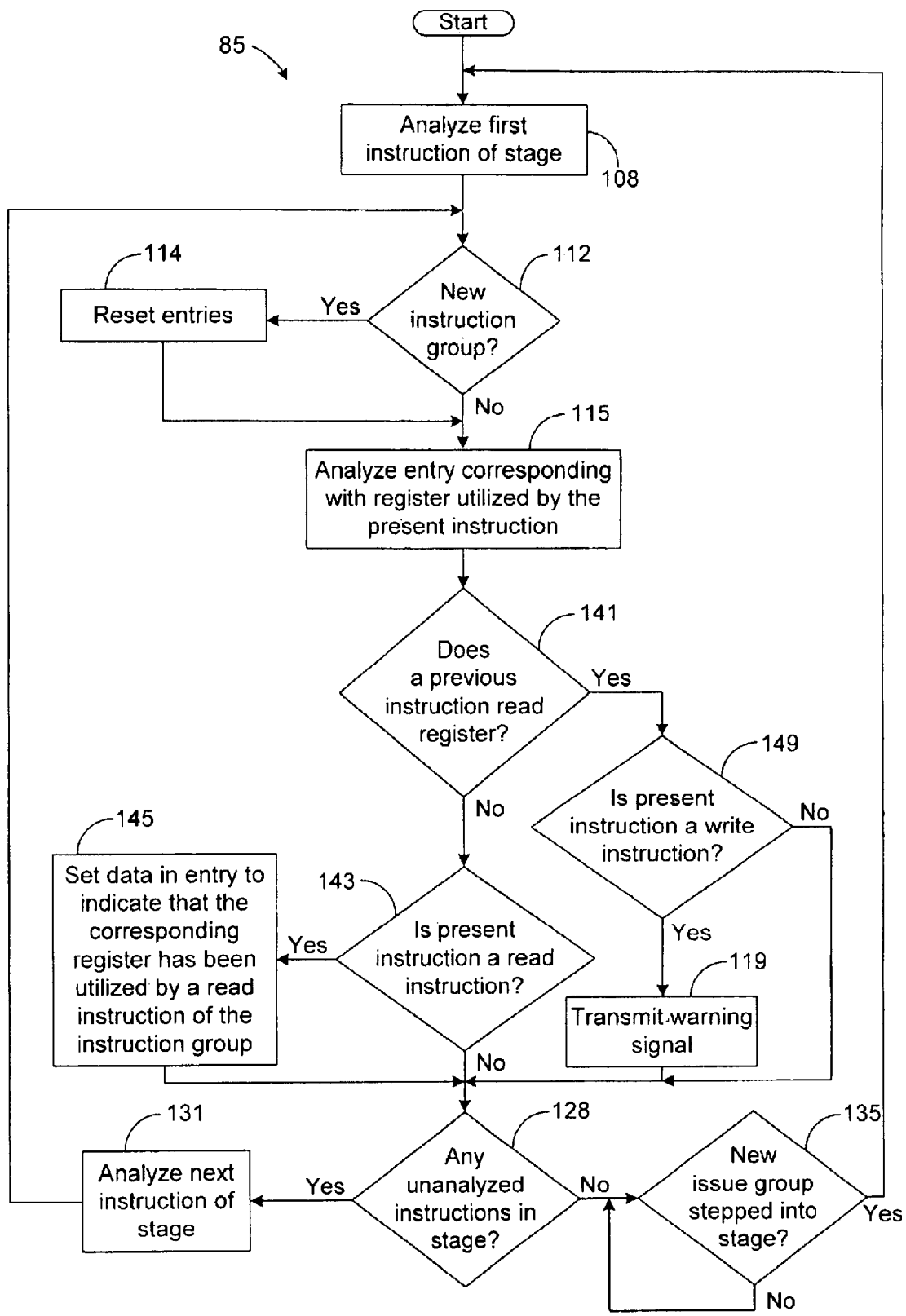
FIG. 7 is a flow chart illustrating additional architecture and functionality that may be employed by the control mechanism depicted in FIG. 4 in another embodiment of the present invention.

As mentioned hereinbefore, the control mechanism 85 can be configured to transmit a warning signal in response to a detection of a write-after-read data hazard. To perform this functionality, the control mechanism 85 is configured to implement the functionality of FIG. 7. As can be seen by comparing FIG. 6 to FIG. 7, the functionality of FIG. 7 is similar to that of FIG. 6 except that blocks 117, 123 and 125 of FIG. 6 are respectively replaced by blocks 141, 143, and 145. Furthermore, block 149 is added.

In this regard, the control mechanism 85 in block 117 of FIG. 6 determines, via block 115, whether it has previously detected a write instruction that is in the same instruction group and that utilizes the same register as the present instruction, but in block 141 of FIG. 7, the control mechanism 85 determines, via block 115, whether it has previously detected a read instruction that is in the same instruction group and that utilizes the same register as the present instruction. Furthermore, the control mechanism 85 in block 123 of FIG. 6 determines whether the present instruction is a write instruction, but the control mechanism 85 in block 143 of FIG. 7 determines whether the present instruction is a read instruction. In addition, the control mechanism 85 in block 125 of FIG. 6 sets the data in the entry corresponding with the register utilized by the present instruction to indicate that another write instruction utilizing the register has been detected, but the control mechanism 85 in block 145 of FIG. 7 sets the data in the entry corresponding with the register utilized by the present instruction to indicate that a read instruction utilizing the register has been detected.

Block 149 of FIG. 7 ensures that a warning signal is not transmitted in response to a determination that an older read instruction utilizes the register as another read instruction. As known in the art, two read instructions utilizing the same register is not likely to cause an error, and the user does not usually need to be warned of such an event, even when the two read instructions are in the same instruction group. Other than the aforementioned differences, the functionality of FIG. 7 is the same as that of FIG. 6. As a result, a warning signal is produced by the control mechanism 85 when the control mechanism 85 detects an older read instruction and a younger write instruction in the same instruction group.

In analyzing the instructions of a computer program 41, the control mechanism 85 may be configured to implement the functionality of both FIG. 6 and FIG. 7. However, the control mechanism 85 may need to analyze more than one entry in block 115 so that the control mechanism 85 may implement blocks 117 and 141. In this regard, a first entry corresponding with a particular register should indicate whether an older write instruction utilizing the particular register exists in the same instruction group as the present instruction, and the second entry should indicate whether an older read instruction utilizing the aforementioned particular register exists in the same instruction group as the present instruction. Therefore, in block 125, the control mechanism 85 should manipulate the data in the first entry, and in block 145, the control mechanism 85 should manipulate the data in the second entry. Alternatively, a single entry may be used for each register as long as the entry is capable of indicating not only whether the register corresponding with the entry has been previously used by another instruction of an instruction group but also what types (i.e., read and/or write) of instructions within the instruction group have previously utilized the corresponding register.

It should be further noted that control mechanism 85 may perform other functionality in addition to the functionality depicted by FIG. 6 and FIG. 7. For example, while waiting for the next issue group in block 135, the control mechanism 85 may analyze other instructions in other stages 77, 81, and/or 83 to determine if any instructions need to be stalled. Therefore, it should be apparent to one skilled in the art that the functionality of the control mechanism 85 should not be limited to the functionality depicted by FIG. 6 and FIG. 7.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the claims.

What is claimed is:

1. A computer system for processing instructions of computer programs and for detecting hazards within said computer programs, comprising:
    memory having a plurality of entries respectively corresponding with a plurality of registers;
    a plurality of pipelines;
    an instruction dispersal unit (IDU) configured to receive compiled data, said compiled data comprising a plurality of instructions and instruction group data identifying a group of said instructions, said instruction group data based on whether a compiler detected a data hazard between said instructions of said instruction group, said IDU configured to transmit said instructions of said compiled data to said pipelines based on said instruction group data; and
    a control mechanism configured to analyze each instruction within said instruction group and to control each of said entries based on whether said control mechanism has detected an instruction, within said instruction group, associated with a corresponding register, said control mechanism configured to identify one of said entries that corresponds to a register associated with one of said instructions of said instruction group, said control mechanism further configured to make a determination, based on said one entry, as to whether any instruction of said instruction group previously analyzed by said control mechanism is associated with said register, said control mechanism further configured to transmit a warning signal based on said determination, said warning signal indicative of a compiler grouping error.

2. The system of claim 1, wherein said one entry is a bit.

3. The system of claim 1, wherein said control mechanism is further configured to reset said entries in response to a determination that each of said instructions in said instruction group has been analyzed by said control mechanism.

4. The system of claim 3, wherein said control mechanism is further configured to analyze said instructions in program order.

5. The system of claim 1, said control mechanism is further configured to store a data value in said entry in response to a determination by said control mechanism that an instruction of said instruction group is associated with said register.

6. The system of claim 1, wherein said control mechanism is further configured to store a data value in said entry in response to a determination by said control mechanism that an instruction of said instruction group is associated with said register and is a write instruction.

7. The system of claim 6, wherein said one entry is a bit.

8. The system of claim 1, wherein said control mechanism is configured to reset said entry based on said instruction group data.

9. A computer system for processing instructions of computer programs and for detecting hazards within said computer programs, comprising:
    memory having a plurality of entries respectively corresponding with a plurality of registers;
    a plurality of pipelines;
    an instruction dispersal unit (IDU) configured to receive compiled data, said compiled data comprising a plurality of instructions and instruction group data identifying a group of said instructions, said instruction group data based on whether a compiler detected a data hazard between said instructions of said instruction group, said IDU configured to transmit said instructions of said compiled data to said pipelines based on said instruction group data;
    a control mechanism configured to analyze each instruction within said instruction group and to control each of said entries based on whether said control mechanism has detected an instruction, within said instruction group, associated with a corresponding register, said control mechanism configured to identify one of said entries that corresponds to a register associated with one of said instructions of said instruction group, said control mechanism further configured to make a determination, based on said one entry, as to whether any instruction of said instruction group previously analyzed by said control mechanism is associated with said register, said control mechanism further configured to transmit a warning signal based on said determination; and
    a system manager configured to receive said warning signal and to terminate execution of said instructions of said compiled data in response to said warning signal.

10. A computer system for processing instructions of computer programs and for detecting hazards within said computer programs, comprising:
    memory having a plurality of entries respectively corresponding with a plurality of registers;
    a plurality of pipelines;
    an instruction dispersal unit (IDU) configured to receive compiled data, said compiled data comprising a plurality of instructions and instruction group data identifying a group of said instructions, said instruction group data based on whether a compiler detected a data hazard between said instructions of said instruction group, said IDU configured to transmit said instructions of said compiled data to said pipelines based on said instruction group data;
    a control mechanism configured to analyze each instruction within said instruction group and to control each of said entries based on whether said control mechanism has detected an instruction, within said instruction group, associated with a corresponding register, said control mechanism configured to identify one of said entries that corresponds to a register associated with one of said instructions of said instruction group, said control mechanism further configured to make a determination, based on said one entry, as to whether any instruction of said instruction group previously analyzed by said control mechanism is associated with said register, said control mechanism further configured to transmit a warning signal based on said determination; and a display device configured to receive said warning signal and to produce a warning message in response to said warning signal.

11. A superscalar processing system for processing instructions of computer programs and for detecting hazards within said computer programs, comprising:

memory having a plurality of entries respectively corresponding with a plurality of registers;

means for receiving compiled data, said compiled data comprising an instruction group and instruction group data indicating that a compiler did not detect a data hazard between instructions of said instruction group, said receiving means further comprising a means for transmitting said instructions to a plurality of pipelines based on said instruction group data;

means for controlling each of said entries based on whether said controlling means has detected, within said instruction group, an instruction associated with a corresponding register; and means for analyzing a first instruction of said instruction group, said analyzing means further comprising:

means for identifying, based on said first instruction, one of said memory entries that corresponds to a register associated with said first instruction;

means for analyzing said one entry;

means for determining whether said one entry indicates that a second instruction within said instruction group is associated with said register, said determining means based on said instruction group data; and means for transmitting a warning signal based on said determining means, said warning signal indicative of a compiler grouping error.

12. The system of claim 11, wherein said analyzing means further comprises a means for resetting said memory entries based on said instruction group data.

13. A method for detecting hazards within computer programs, comprising the steps of:

maintaining a plurality of memory entries, said memory entries respectively corresponding with different registers;

receiving compiled data, said compiled data comprising a plurality of instructions and instruction group data identifying a group of said instructions, said instruction group data based on whether a compiler detected a data hazard between said instructions of said instruction group;

controlling each of said entries based on whether said instruction group comprises an instruction associated with a corresponding register;

transmitting said instructions of said compiled data to a plurality of pipelines based on said instruction group data;

analyzing a first instruction of said instruction group;

identifying one of said memory entries that corresponds to a register associated with said first instruction;

analyzing said one entry in response to said identifying step;

determining, via said analyzing said entry step, whether said one entry indicates that a second instruction within said instruction group is associated with said register; and transmitting a warning signal based on said determining step, said warning signal indicative of a compiler grouping error.

14. The system of claim 13, wherein said one entry is a bit.

15. The method of claim 13, further comprising the step of resetting said one entry in response to a determination that each of said instructions of said instruction group has been analyzed.

16. The method of claim 13, further comprising the steps of:

analyzing an instruction of said compiled data to determine whether said instruction of said compiled data is associated with a different instruction group; and resetting said one entry in response to a determination, in said analyzing an instruction of said compiled data step, that said instruction of said compiled data is associated with said new instruction group.

17. The method of claim 13, further comprising the step of:

storing a data value in said one entry in response to a determination that an instruction is associated with said register.

18. The method of claim 13, further comprising the step storing a data value in said one entry in response to a determination that an instruction is associated with said register and is a write instruction.

19. The method of claim 18, wherein said one entry is a bit.

20. The method of claim 13, further comprising the step of resetting said memory entries based on said instruction group data.

21. A method for detecting hazards within computer programs, comprising the steps of:

maintaining a plurality of memory entries, said memory entries respectively corresponding with different registers;

receiving compiled data, said compiled data comprising a plurality of instructions and instruction group data identifying a group of said instructions, said instruction group data based on whether a compiler detected a data hazard between said instructions of said instruction group;

controlling each of said entries based on whether said instruction group comprises an instruction associated with a corresponding register;

transmitting said instructions of said compiled data to a plurality of pipelines based on said instruction group data;

analyzing a first instruction of said instruction group;

identifying one of said memory entries that corresponds to a register associated with said first instruction;

analyzing said one entry in response to said identifying step;

determining, via said analyzing said entry step, whether said one entry indicates that a second instruction within said instruction group is associated with said register;

transmitting a warning signal based on said determining step; and producing a warning message in response to said warning signal.

22. A method for detecting hazards within computer programs, comprising the steps of:

maintaining a plurality of memory entries, said memory entries respectively corresponding with different registers;

receiving compiled data, said compiled data comprising a plurality of instructions and instruction group data identifying a group of said instructions, said instruction group data based on whether a compiler detected a data hazard between said instructions of said instruction group;

controlling each of said entries based on whether said instruction group comprises an instruction associated with a corresponding register;

transmitting said instructions of said compiled data to a plurality of pipelines based on said instruction group data;

analyzing a first instruction of said instruction group;

identifying one of said memory entries that corresponds to a register associated with said first instruction;

analyzing said one entry in response to said identifying step;

determining, via said analyzing said entry step, whether said one entry indicates that a second instruction within said instruction group is associated with said register;

transmitting a warning signal based on said determining step; and terminating execution of said instructions of said compiled data in response to said warning signal.

23. A system for processing instructions of computer programs, comprising:

memory having a plurality of entries, each of said entries corresponding with a different register;

an instruction dispersal unit (IDU) configured to receive compiled data, said compiled data comprising a plurality of instructions and instruction group data identifying a group of said instructions, said instruction group data based on whether a compiler detected a data hazard between said instructions of said instruction group; and a control mechanism configured to control said entries such that each of said entries indicates whether the control mechanism has detected an instruction of said instruction group that writes data to one of the registers corresponding with said each entry, said control mechanism configured to analyze, in response to an instruction of said instruction group that identifies one of said registers, one of said entries corresponding with said identified register, said control mechanism further configured to detect, based on said analyzed entry, whether said compiler has incorrectly defined said instruction group such that a data hazard incorrectly exists between a plurality of instructions of said instruction group.

24. The system of claim 23, wherein said control mechanism is further configured to reset said entries based on said instruction group data.

25. The system of claim 23, wherein the control mechanism is configured to transmit a warning signal in response to a detection, by the control mechanism, that the compiler has incorrectly defined the instruction group.

26. The system of claim 25, further comprises a display device configured to display a warning message in response to the warning signal.

27. A method for processing instructions of computer programs, comprising the steps of:

respectively associating a plurality of memory entries with a plurality of registers;

receiving compiled data comprising a plurality of instructions and instruction group data that identifies a group of said instructions, said instruction group data based on whether a compiler detected a data hazard between said instructions of said instruction group;

identifying each of said registers that is to be written to by an instruction of said instruction group;

adjusting each of said entries associated with said identified registers;

detecting a data hazard within said instruction group based on said entries; and transmitting a warning signal in response to said detecting step, said warning signal indicative of a compiler grouping error associated with said instruction group.

28. The method of claim 27, further comprising the step of resetting said entries based on said instruction group data.

29. The method of claim 27, wherein said data hazard indicates that said compiler has incorrectly defined said instruction group data.

30. A processing system, comprising:

memory having a plurality of entries respectively corresponding with a plurality of registers;

a plurality of pipelines;

an instruction dispersal unit (IDU) configured to receive compiled data, said compiled data comprising a plurality of instructions and instruction group data identifying a group of said instructions, said IDU configured to transmit said instructions to said pipelines based on said instruction group data; and a control mechanism configured to update each of said entries based on whether said control mechanism detects an instruction of said instruction group associated with a corresponding one of said registers, said control mechanism further configured to detect a compiler grouping error associated with said instruction group based on said entries.

31. The system of claim 30, wherein said control mechanism is configured to cause said system to display a warning message in response to a detection of said compiler grouping error.

* * * * *

UNITED STATES PATENT AND TRADEMARK OFFICE
CERTIFICATE OF CORRECTION

PATENT NO.    : 6,711,670 B1
DATED         : March 23, 2004
INVENTOR(S)   : Donald Charles Soltis, Jr. et al.

It is certified that error appears in the above-identified patent and that said Letters Patent is hereby corrected as shown below:

<u>Column 18,</u>
Line 13, delete "system" and insert therefor -- method --

Signed and Sealed this

Twenty-sixth Day of July, 2005

JON W. DUDAS
*Director of the United States Patent and Trademark Office*